US006851282B2

(12) United States Patent
Nagayama et al.

(10) Patent No.: US 6,851,282 B2
(45) Date of Patent: Feb. 8, 2005

(54) APPARATUS AND METHOD FOR MAKING OPTICAL FIBER

(75) Inventors: Katsuya Nagayama, Yokohama (JP); Yuichi Ohga, Yokohama (JP); Tatsuhiko Saitoh, Yokohama (JP); Hiroshi Takamizawa, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 280 days.

(21) Appl. No.: 09/991,820

(22) Filed: Nov. 26, 2001

(65) Prior Publication Data

US 2002/0059816 A1 May 23, 2002

Related U.S. Application Data

(63) Continuation of application No. PCT/JP00/03411, filed on May 26, 2000.

(30) Foreign Application Priority Data

May 27, 1999 (JP) ............................................ 11-148153
Oct. 12, 1999 (JP) ............................................ 11-289734

(51) Int. Cl.[7] ........................... C03B 37/02; C03B 37/10
(52) U.S. Cl. ............................ 65/435; 65/384; 65/424; 65/432; 65/477; 264/1.24; 264/2.6
(58) Field of Search ............................. 65/382, 384, 424, 65/430, 432, 431, 435, 447, 475, 477, 488, 491, 507, 509, 510, 513, 529, 530, 533, 537, 538, 187; 264/1.24, 2.6, 2.7

(56) References Cited

U.S. PATENT DOCUMENTS 4,396,409 A * 8/1983 Bailey et al. ................. 65/432
4,673,427 A * 6/1987 Van Der Giessen et al. .. 65/424
5,059,229 A * 10/1991 Blankenship et al. ......... 65/424
5,320,658 A * 6/1994 Ohga et al. ................... 65/435
5,545,246 A * 8/1996 Lysson et al. ................ 65/435
5,897,681 A * 4/1999 Lysson et al. ................ 65/435
6,576,164 B2 * 6/2003 Guenot et al. .............. 264/1.24

FOREIGN PATENT DOCUMENTS

| EP | 321182 A2 | 12/1988 | | |
|---|---|---|---|---|
| JP | 61-97143 | 5/1986 | | |
| JP | 4-59631 | 2/1992 | | |
| JP | 10-25127 | 1/1998 | | |
| JP | 10-218635 | 8/1998 | | |
| JP | 11-116264 | * | 4/1999 | ......... C03B/37/029 |
| JP | 2000-128566 | * | 5/2000 | ......... C03B/37/027 |

OTHER PUBLICATIONS

Shigeki Sakaguchi, "Relaxation of Rayleigh Scattering in Silica Core Optical Fiber with Heat Treatment", NTT Photonics Laboratories, Japan, vol. J83–C, No. 1, pp. 30–36, 2000.

* cited by examiner

Primary Examiner—Peter Chin
Assistant Examiner—Eric Hug
(74) Attorney, Agent, or Firm—McDermott Will & Emery LLP

(57) ABSTRACT

A drawing apparatus 1 has a drawing furnace 11, a heating furnace 21, and a resin curing section 31. The drawing furnace 11 has a muffle tube 13 to which an He gas supply passage 15 from an He gas supply section 14 is connected so as to supply He gas. The optical fiber 3 drawn upon heating by the drawing furnace 11 is fed to the heating furnace 21, whereby a predetermined part of the optical fiber 3 is annealed at a predetermined cooling rate. The heating furnace 21 has a muffle tube 23 to which an $N_2$ gas supply passage 25 from an $N_2$ gas supply section 24 is connected so as to supply $N_2$ gas. Thereafter, the optical fiber 3 is coated with a UV resin 39 by a coating die 38, and the UV resin 39 is cured in the resin curing section 31, whereby a coated optical fiber 4 is formed.

7 Claims, 8 Drawing Sheets

Fig.2

| | 1ST GAS | 2ND GAS | DRAWING RATE (m/s) | TENSION (N) | HEATING FURNACE TEMPERATURE (°C) | ENTERING TEMPERATURE (°C) | AVERAGE COOLING RATE (°C/s) | TRANSMISSION LOSS (dB/km) | RAYLEIGH SCATTERING COEFFICIENT (dBµm⁴/km) | GLASS DIAMETER FLUCTUATION (µm) |
|---|---|---|---|---|---|---|---|---|---|---|
| EXAMPLE1 | He | N₂ | 4 | 0.245 | 1400 | 1600 | 600~800 | 0.170 | 0.84 | ±0.1 |
| EXAMPLE2 | He | N₂ | 4 | 0.785 | 1400 | 1600 | 500~700 | 0.182 | 0.92 | ±0.1 |
| COMPARATIVE EXAMPLE1 | He | He | 4 | 0.245 | — | — | ABOUT 30000 | 0.18 | 0.9 | — |
| COMPARATIVE EXAMPLE2 | He | N₂ | 4 | 0.245 | — | — | ABOUT 4000~5000 | 0.174 | 0.86 | — |
| COMPARATIVE EXAMPLE3 | N₂ | N₂ | 4 | 0.245 | 1400 | — | — | 0.170 | 0.84 | ±0.3 |

Fig.5

| | OPTICAL FIBER PREFORM OUTER DIAMETER (mm) | 1ST GAS | 2ND GAS | DRAWING RATE (m/min) | GLASS DIAMETER FLUCTUATION ($\mu$m) | BENDING ABNORMALITY RATIO (%) | No. OF SPIKES (TIMES) | TRANSMISSION LOSS (dB/km) | RAYLEIGH SCATTERING COEFFICIENT (dB$\mu$m$^4$/km) |
|---|---|---|---|---|---|---|---|---|---|
| EXAMPLE3 | 40 | $N_2$ | AIR | 400 | ±0.15 | 0 | 0 | 0.167 | 0.835 |
| EXAMPLE4 | 80 | He | AIR | 400 | ±0.15 | 0 | 0 | 0.168 | 0.84 |
| EXAMPLE5 | 80 | He | He | 400 | ±0.15 | 0 | 0 | 0.169 | 0.845 |
| COMPARATIVE EXAMPLE4 | 40 | $N_2$ | AIR | 400 | ±0.8 | 20 | 0 | 0.168 | 0.84 |
| COMPARATIVE EXAMPLE5 | 40 | $N_2$ | $N_2$ | 400 | ±0.15 | 0 | 12 | 0.167 | 0.835 |
| COMPARATIVE EXAMPLE6 | 40 | $N_2$ | $N_2$ | 400 | ±0.15 | 0 | 1 | 0.171 | 0.855 |

APPARATUS AND METHOD FOR MAKING OPTICAL FIBER

REFERENCE TO RELATED APPLICATION

This Application is a continuation of International Application No. PCT/IP00/03411, whose international filing date is May 26, 2000, which in turn claims the benefit of Japanese Patent Application No. 1999-148153, filed May 27, 1999, and Japanese Patent Application No. 1999-289734, filed Oct. 12, 1999, the disclosures of which Applications are incorporated by reference herein. The benefit of the filing and priority dates of the International and Japanese Applications is respectfully requested.

RELATED APPLICATION

This is a continuation-in-part application of application serial no. PCT/JP00/03411 filed on May 26, 2000, now pending.

BACKGROUND OF THE INVENTION

1. Field of the Invention

The present invention relates to a method and apparatus for making an optical fiber whose transmission loss is lowered by reducing its Rayleigh scattering intensity.

2. Related Background Art

As a method of making an optical fiber whose transmission loss is lowered by reducing its Rayleigh scattering loss, one disclosed in Japanese Patent Application Laid-Open No. HEI 10-25127 has been known, for example. In this manufacturing method, an optical fiber preform is drawn upon heating so as to prepare an intermediate optical fiber, which is then reheated so as to be subjected to a heat treatment, whereby the reheating lowers the virtual temperature (the temperature to which the randomness of the state of atomic arrangement within the glass corresponds) due to the structural relaxation (rearrangement of atoms) in the glass, thus reducing its Rayleigh scattering intensity.

However, the surface of the optical fiber immediately after drawing is coated with a UV resin or the like in order to protect the heated and drawn optical fiber. The above-mentioned method of making an optical fiber disclosed in Japanese Patent Application Laid-Open No. HEI 10-25127 is not suitable for mass-producing coated optical fibers, since the resin coated on the optical fiber surface is burned by the heat at the time of reheating. Though the optical fiber may be reheated while in an uncoated state, it is not applicable as a mass-producing method due to damages at the time of handling the optical fiber and the like.

SUMMARY OF THE INVENTION

In view of the points mentioned above, it is an object of the present invention to provide a method and apparatus for making an optical fiber, which is applicable to the mass production of coated optical fibers whose surface is coated with a resin when making optical fibers whose transmission loss is lowered by reducing its Rayleigh scattering intensity.

The inventors diligently studied apparatus and methods for making an optical fiber applicable to the mass production of coated optical fibers and, as a result, have newly found the following fact concerning the relationship between the Rayleigh scattering intensity and the cooling rate of optical fibers after drawing.

Within the glass at a higher temperature, atoms are vigorously vibrating due to thermal energy, whereby the atomic arrangement is in a state more random than that in the glass at a lower temperature. When the glass at a higher temperature is cooled slowly, atoms are cooled while being arranged with a randomness corresponding to each temperature within the temperature range in which the atoms are allowed to be rearranged, whereby the randomness of atoms within the glass attains a state corresponding to the lowest temperature (1200° C.) at which the structural relaxation proceeds. When the glass at a higher temperature is drastically cooled, however, it is cooled and fixed before the atomic arrangement reaches an equilibrium state corresponding to each temperature, whereby the atomic arrangement attains a state more random than that in the case annealed. The Rayleigh scattering intensity becomes higher as the atomic arrangement is more random even in the same material. Optical fibers which are usually cooled at a cooling rate of 5000 to 30000° C./s after the drawing are presumed to have an atomic arrangement more random than that in bulk glass, thus yielding a state with a higher virtual temperature, thereby increasing the Rayleigh scattering intensity.

Since the time required for structural relaxation becomes longer as the temperature is lower, on the other hand, the structural relaxation does not occur until the temperature is maintained for several tens of hours at about 1200° C., for example. Since an optical fiber after drawing is usually cooled from about 2000° C. to about 400° C. in a fraction of a second, it is necessary for the optical fiber to be annealed in a state having a temperature higher than 1200° C. in order to lower the virtual temperature so as to make it approach 1200° C. in a short period of time during which the optical fiber in the drawing step is cooled.

Therefore, taking account of the optical fiber temperature and cooling rate after drawing, the inventors investigated the relationship between the cooling rate and Rayleigh scattering coefficient in a part where the temperature ranged from 1200 to 1700° C., thus being higher than the lowest temperature (about 1200° C.) at which the above-mentioned structural relaxation proceeded but lower than 1700° C. at which the structural relaxation proceeded in a very short period of time. As a result, it has been verified that the relationship indicated by FIG. 8 exists between the cooling rate and Rayleigh scattering coefficient in the part where the temperature of the optical fiber ranges from 1200 to 1700° C. As represented by the following expression (1), the Rayleigh scattering intensity (I) has such a property that it is inversely proportional to the fourth power of wavelength ($\lambda$):

$$I = A/\lambda^4 \qquad (1)$$

where the coefficient A is defined as the Rayleigh scattering coefficient.

These results have proved that, if the cooling rate of an optical fiber before being coated with a resin after being drawn upon heating is slowed down, then the Rayleigh scattering intensity of the optical fiber can be reduced, so as to lower the transmission loss.

In order to achieve the above-mentioned object in view of such results of studies, the present invention provides an apparatus for making an optical fiber, which draws an optical fiber preform upon heating and coats thus drawn optical fiber with a resin; the apparatus comprising a drawing furnace for drawing the optical fiber preform upon heating in an atmosphere constituted by a first gas having a predetermined thermal conductivity; a resin coating section for coating the drawn optical fiber with the resin; and a heating furnace, disposed between the drawing furnace and the resin coating section, for heating and annealing the drawn optical fiber in an atmosphere constituted by a second gas having a thermal conductivity lower than the predetermined thermal conductivity of the first gas and wherein the first gas is supplied into an upper portion of the drawing furnace so as to flow downward the drawing furnace and is discharged from a first gas exit section disposed between the drawing furnace and the heating furnace.

Since the heating furnace for heating and annealing the drawn optical fiber in an atmosphere constituted by the second gas having a thermal conductivity lower than the predetermined thermal conductivity of the first gas is provided between the drawing furnace and the resin coating section, the thermal conductivity of the atmosphere gas for the optical fiber within the heating furnace is lowered, so that the cooling rate of the optical fiber before being coated with a resin after being drawn upon heating is slowed down in a predetermined segment, whereby the optical fiber is annealed. Therefore, the virtual temperature of the optical fiber is lowered, so that the randomness in atomic arrangement is reduced, whereby it is possible to make, in a very short period of time from the drawing upon heating to the resin coating, an optical fiber whose transmission loss is lowered by reducing its Rayleigh scattering intensity. Since the Rayleigh scattering intensity is reduced by controlling the cooling rate of the optical fiber before being coated with a resin after being drawn, the heat treatment for reheating such as that in the above-mentioned prior art is unnecessary, whereby the apparatus can be applied quite easily to the mass production of coated optical fibers whose surface is coated with a resin. Since the atmosphere gas for the optical fiber within the drawing furnace has a thermal conductivity higher than that of the second gas acting as the atmosphere gas within the heating furnace, the optical fiber preform is softened upon heating and rapidly cooled until it approximates a predetermined diameter, whereby the outer diameter of optical fiber can be restrained from fluctuating. Also, since the first gas is discharged from the first gas exit section disposed between the drawing furnace and the heating furnace, the occurrence of such a state that the first gas flows into the heating furnace side is suppressed, whereby the thermal conductivity of atmosphere gas within the thermal conductivity of atmosphere gas within the heating furnace are maintained appropriately. Therefore, it becomes possible to stably make an optical fiber whose transmission loss is lowered while its outer diameter is restrained from fluctuating.

The apparatus for making an optical fiber in accordance with the present invention may be characterized in that the heating furnace is disposed with a gap with respect to the drawing furnace.

Providing a gap between the heating furnace and the drawing furnace suppresses the occurrence of such a state that the first gas flows into the heating furnace side or the second gas flows into the drawing furnace side, whereby the thermal conductivity of atmosphere gas within the drawing furnace and the thermal conductivity of atmosphere gas within the heating furnace are maintained appropriately. Therefore, it becomes possible to stably make an optical fiber whose transmission loss is lowered while its outer diameter is restrained from fluctuating.

The apparatus for making an optical fiber in accordance with the present invention may be characterized in that the first gas is He gas, whereas the second gas is one of $N_2$ gas, Ar gas, and air.

When the first gas is He gas while the second gas is one of $N_2$ gas, Ar gas, and air, the thermal conductivity of atmosphere gas within the drawing furnace and the thermal conductivity of atmosphere gas within the heating furnace can be set to appropriate values.

The apparatus for making an optical fiber in accordance with the present invention may be characterized in that the heating furnace has a muffle tube for passing the drawn optical fiber therethrough, whereas the muffle tube is disposed at a position where the drawn optical fiber has an entering temperature within the range of 1400 to 1800° C. with respect to the muffle tube.

When the heating furnace is disposed at a position where the drawn optical fiber has an entering temperature within the range of 1400 to 1800° C. with respect to the muffle tube, the cooling rate of the optical fiber in a part attaining a temperature of 1300 to 1700° C. is slowed down in a predetermined segment, whereby the virtual temperature of the optical fiber is further lowered, which makes it possible to further reduce the Rayleigh scattering intensity.

In order to achieve the above-mentioned object in view of the above-mentioned results of studies, the present invention provides a method of making an optical fiber, which draws an optical fiber preform upon heating and coats thus drawn optical fiber with a resin; the method comprising the steps of drawing the optical fiber preform upon heating in an atmosphere constituted by a first gas having a predetermined thermal conductivity; heating and annealing the drawn optical fiber in an atmosphere constituted by a second gas having a thermal conductivity lower than the predetermined thermal conductivity of the first gas; coating the annealed optical fiber with the resin; supplying the first gas into an upper portion of the drawing furnace so that the first gas flows downward the drawing furnace; and discharging the first gas from a first gas exit section disposed between the drawing furnace and the heating furnace.

Since the optical fiber preform is drawn upon heating in an atmosphere constituted by the first gas, and then the drawn optical fiber is heated and annealed in an atmosphere constituted by the second gas having a thermal conductivity lower than the predetermined thermal conductivity of the first gas, the cooling rate of the optical fiber before being coated with the resin after being drawn upon heating is slowed down in a predetermined segment. Therefore, the virtual temperature of the optical fiber is lowered, so that the randomness in atomic arrangement is reduced, whereby it is possible to make, in a short period of time from the drawing upon heating to the resin coating, an optical fiber whose transmission loss is lowered by reducing its Rayleigh scattering intensity. Since the Rayleigh scattering intensity is reduced by controlling the cooling rate of the optical fiber before being coated with a resin after being drawn, the heat treatment for reheating such as that in the above-mentioned prior art is unnecessary, whereby the method can be applied quite easily to the mass production of coated optical fibers whose surface is coated with a resin. Since the optical fiber preform is drawn upon heating in an atmosphere gas constituted by the first gas having a thermal conductivity higher than that of the second gas, the optical fiber preform is softened upon heating and rapidly cooled until it approximates a predetermined diameter, whereby the outer diameter of optical fiber can be restrained from fluctuating. Also, since the first gas is discharged from the first gas exit section disposed between the drawing furnace and the heating furnace, the occurrence of such a state that the first gas flows into the heating furnace side is suppressed, whereby the thermal conductivity of atmosphere gas within the thermal conductivity of atmosphere gas within the heating furnace are maintained appropriately. Therefore, it becomes possible to stably make an optical fiber whose transmission loss is lowered while its outer diameter is restrained from fluctuating.

The method of making an optical fiber in accordance with the present invention may be characterized in that the heating furnace disposed with a predetermined distance with respect to the drawing furnace for drawing the optical fiber preform upon heating is used, so as to anneal the drawn optical fiber in the heating furnace.

Using the heating furnace disposed with a predetermined distance with respect to the drawing furnace suppresses the occurrence of such a state that the first gas flows into the heating furnace side or the second gas flows into the drawing furnace side, whereby the thermal conductivity of atmosphere gas within the drawing furnace and the thermal conductivity of atmosphere gas within the heating furnace are maintained appropriately. Therefore, it becomes possible to stably make an optical fiber whose transmission loss is lowered while its outer diameter is restrained from fluctuating.

The method of making an optical fiber in accordance with the present invention may be characterized in that He gas is used as the first gas, whereas one of $N_2$ gas, Ar gas, and air is used as the second gas.

When He gas is used as the first gas while one of $N_2$ gas, Ar gas, and air is used as the second gas, the thermal conductivity of atmosphere gas within the drawing furnace and the thermal conductivity of atmosphere gas within the heating furnace can be set to appropriate values.

The method of making an optical fiber in accordance with the present invention may be characterized in that, as the heating furnace, a heating furnace having a muffle tube disposed at a position where the drawn optical fiber has an entering temperature within the range of 1400 to 1800° C. with respect to the muffle tube is used, so as to anneal the drawn optical fiber in the heating furnace.

When the heating furnace disposed at a position where the drawn optical fiber has an entering temperature within the range of 1400 to 1800° C. with respect to the muffle tube is used, the cooling rate of the optical fiber in a part attaining a temperature of 1300 to 1700° C. can be slowed down in a predetermined segment, whereby the virtual temperature of the optical fiber is further lowered, which makes it possible to further reduce the Rayleigh scattering intensity.

Also, the inventors have newly found the following facts. A heating furnace for heating and annealing the optical fiber drawn by the drawing furnace may be disposed in order to slow down the cooling rate in a predetermined segment in a part where the optical fiber has a temperature of 1200 to 1700° C. When this heating furnace is disposed so as to be directly connected to the drawing furnace, however, the dust occurring within the drawing furnace may enter the heating furnace and attach to the optical fiber within the heating furnace, thereby causing such problems as "spike" by which the glass diameter of the optical fiber changes temporarily, and the decrease in strength of the optical fiber. Examples of the dust occurring within the drawing furnace include (1) those occurring due to the wear and deterioration of the muffle tube in the drawing furnace, (2) those occurring upon recrystallization of volatile components in the optical fiber preform, (3) those generated upon reactions of the volatile components in the optical fiber preform with constituents of the muffle tube, (4) those occurring upon reactions with these products with gases flowing through the muffle tube of the drawing furnace, and the like.

When the heating furnace is not directly connected to the drawing furnace but disposed with a gap with respect to the drawing furnace, the cooling of the optical fiber may become uneven since the optical fiber let out of the drawing furnace is under the influence of the turbulence of outside air flows before entering the heating furnace, thereby causing such a problem as "glass diameter fluctuation" in which the glass diameter of the optical fiber periodically changes, or the deterioration in bending of the optical fiber.

In order to achieve the above-mentioned object in view of such results of the studies, the present invention provides a method of making an optical fiber, which draws an optical fiber preform upon heating; the method comprising the steps of using a drawing furnace for drawing the optical fiber preform in an atmosphere constituted by a first gas and a heating furnace, disposed with a gap with respect to the drawing furnace, for heating and annealing in an atmosphere constituted by a second gas the optical fiber drawn by the drawing furnace; forming the gap between the drawing furnace and the heating furnace into a gas mixture layer in which the first and second gases exist in a mixed state; feeding the optical fiber drawn by the drawing furnace to the heating furnace by way of the gas mixture layer; and heating the drawn optical fiber in the heating furnace such that the optical fiber has a temperature within the range of 1200 to 1700° C.

Since the drawn optical fiber is heated in the heating furnace such that the optical fiber has a temperature within the range of 1200 to 1700° C., the cooling rate of the optical fiber drawn upon heating in the part where the optical fiber has a temperature within the range of 1200 to 1700° C. is slowed down in a predetermined segment, whereby the optical fiber is annealed. Therefore, the virtual temperature of the optical fiber decreases, so that the randomness in atomic arrangement is reduced, whereby it is possible to make, in a very short period of time from the drawing upon heating to the resin coating, an optical fiber whose transmission loss is lowered by reducing its Rayleigh scattering intensity. Since the Rayleigh scattering intensity is reduced by controlling the cooling rate of the optical fiber before being coated with a resin after being drawn, the heat treatment for reheating such as that in the above-mentioned prior art is unnecessary, whereby the method can be applied quite easily to the mass production of coated optical fibers whose surface is coated with a resin.

Since the heating furnace is disposed with a gap with respect to the drawing furnace while the gap between the heating furnace and the drawing furnace is formed into a gas mixture layer in which the first and second gases exist in a mixed state, the dust occurring within the drawing furnace is restrained from entering the heating furnace, whereby the above-mentioned occurrence of "spike" or deterioration in the strength of the optical fiber can be suppressed. Also, since the gas mixture layer exists, the turbulence of outside air flows becomes less influential between the drawing furnace and the heating furnace, whereby the above-mentioned occurrence of "glass diameter fluctuation" or deterioration in bending of the optical fiber can be suppressed.

The method of making an optical fiber in accordance with the present invention may be characterized in that a barrier for separating the gas mixture layer from the outside air is provided, whereas the barrier is formed with a gas exit section for letting out at least the first gas.

When the barrier is provided, the turbulence in outside air flows becomes less influential, whereby the occurrence of "glass diameter fluctuation" or deterioration in bending of the optical fiber can further be suppressed. When the gas exit section for letting out at least the first gas is formed, the dust occurring within the drawing furnace is further restrained from entering the heating furnace, whereby the above-mentioned occurrence of "spike" or deterioration in strength of the optical fiber can further be suppressed.

The method of making an optical fiber in accordance with the present invention may be characterized in that a gas having a thermal conductivity on a par with or lower than that of the first gas is used as the second gas.

When a gas having a thermal conductivity on a par with or lower than that of the first gas is used as the second gas, drawing can be carried out stably when an optical fiber preform having a relatively large diameter is used for drawing in particular, and an optical fiber whose transmission loss is lowered can be made.

The method of making an optical fiber in accordance with the present invention may be characterized in that the drawn optical fiber has an entering temperature within the range of 1400 to 1900° C. with respect to the gas mixture layer.

When the drawn optical fiber has an entering temperature within the range of 1400 to 1900° C. with respect to the gas mixture layer, the drawn optical fiber at a high temperature is annealed in the heating furnace, whereby the transmission loss of optical fiber can be lowered.

In order to achieve the above-mentioned object in view of the results of studies mentioned above, the present invention provides an apparatus for making an optical fiber, which draws an optical fiber preform upon heating; the apparatus comprising a drawing furnace for drawing the optical fiber preform upon heating in an atmosphere constituted by a first gas; and a heating furnace, disposed with a gap with respect to the drawing furnace, for heating the drawn optical fiber in an atmosphere constituted by a second gas such that the optical fiber attains a temperature within the range of 1200 to 1700° C.; wherein the gap between the drawing furnace and the heating furnace is formed into a gas mixture layer in which the first and second gases exist in a mixed state.

Since the drawn optical fiber is heated in the heating furnace such that the optical fiber attains a temperature within the range of 1200 to 1700° C., the cooling rate of the optical fiber in a part attaining a temperature of 1200 to 1700° C. is slowed down in a predetermined segment, whereby the optical fiber is annealed. Therefore, the virtual temperature of the optical fiber decreases, so that the randomness in atomic arrangement is reduced, whereby it is possible to make, in a very short period of time from the drawing upon heating to the resin coating, an optical fiber whose transmission loss is lowered by reducing its Rayleigh scattering intensity. Since the Rayleigh scattering intensity is reduced by controlling the cooling rate of the optical fiber before being coated with a resin after being drawn, the heat treatment for reheating such as that in the above-mentioned prior art is unnecessary, whereby the apparatus can be applied quite easily to the mass production of coated optical fibers whose surface is coated with a resin.

Since the heating furnace is provided with a gap with respect to the drawing furnace while the gap between the heating furnace and the drawing furnace is formed into a gas mixture layer in which the first and second gases exist in a mixed state, the dust occurring within the drawing furnace is restrained from entering the heating furnace, whereby the above-mentioned occurrence of "spike" or deterioration in strength of the optical fiber can further be suppressed. Also, since the gas mixture layer exists, the turbulence of outside air flows becomes less influential between the drawing furnace and the heating furnace, whereby the above-mentioned occurrence of "glass diameter fluctuation" or deterioration in bending of the optical fiber can be suppressed.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2 is a table showing Examples in conformity to the first embodiment of the apparatus and method for making an optical fiber in accordance with the present invention and Comparative Examples;

FIG. 5 is a table showing Examples in conformity to the second embodiment of the apparatus and method for making an optical fiber in accordance with the present invention and Comparative Examples;

DESCRIPTION OF THE PREFERRED EMBODIMENTS

Embodiments of the present invention will be explained with reference to the drawings. In the explanation of the drawings, constituents identical to each other will be referred to with numerals identical to each other without repeating their overlapping descriptions.

First Embodiment

To begin with, a first embodiment of the apparatus and method for making an optical fiber in accordance with the present invention will be explained with reference to FIG. 1.

Figure 1:
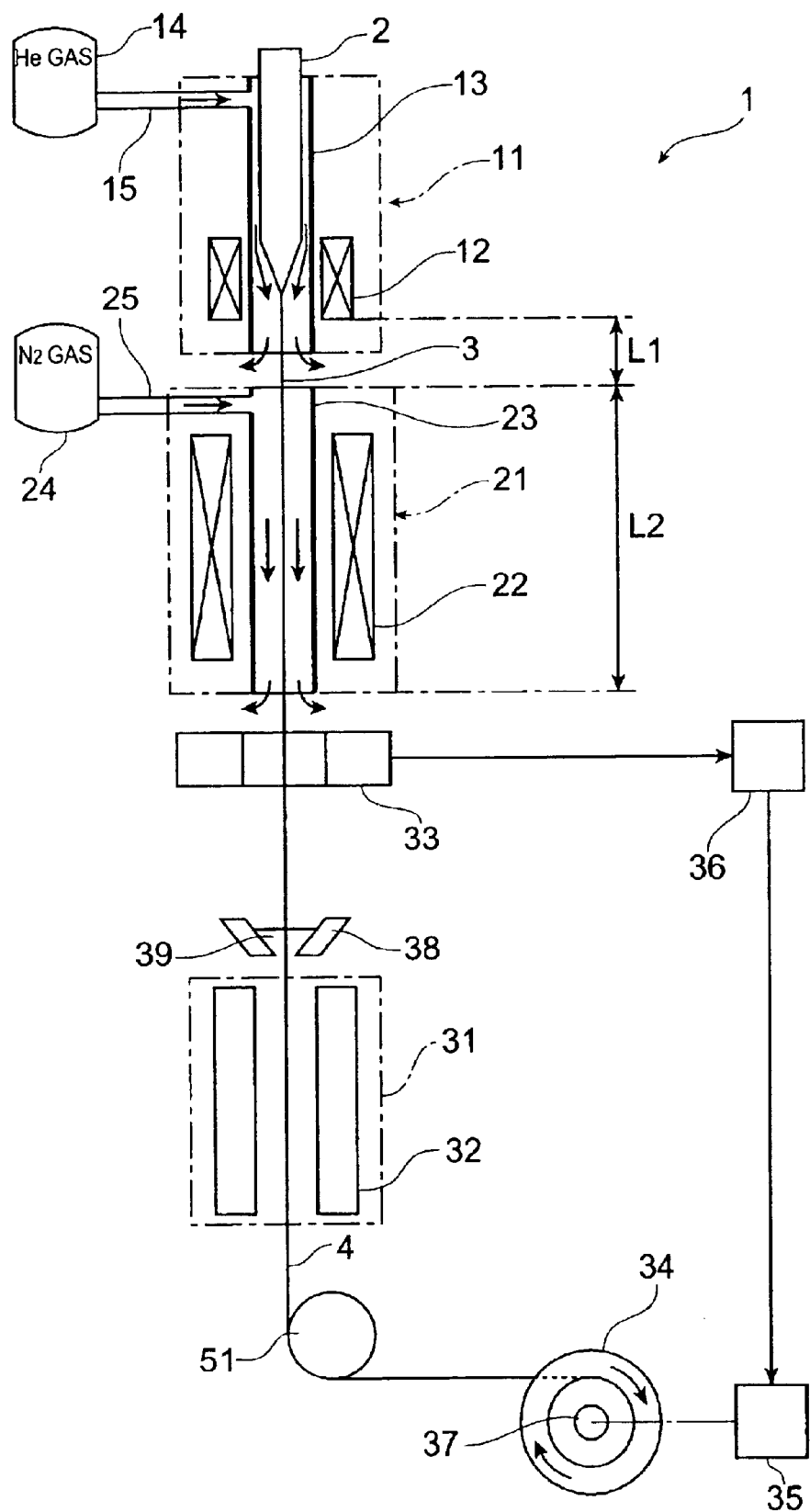
FIG. 1 is a schematic diagram showing a first embodiment of the apparatus and method for making an optical fiber in accordance with the present invention.

A drawing apparatus 1 is a drawing apparatus for silica type optical fibers, having a drawing furnace 11, a heating furnace 21 for annealing, and a resin curing section 31 which are disposed in this order in the drawing direction of an optical fiber preform 2 (downward in FIG. 1). The optical fiber preform 2 held by a preform supply apparatus (not depicted) is supplied to the drawing furnace 11, and the lower end of the optical fiber preform 2 is heated and softened by a heater 12 within the drawing furnace 11, whereby an optical fiber 3 is drawn. The drawing furnace 11 has a muffle tube 13 configured such that an He gas supply passage 15 from an He gas supply section 14 is connected thereto, so as to supply He gas as a first gas into the muffle tube 13 of the drawing furnace 11, whereby an He gas atmosphere is attained within the muffle tube 13. The optical fiber 3 drawn upon heating is drastically cooled to about 1700° C. within the muffle tube 13. Thereafter, the optical fiber 3 is let out of the drawing furnace 11 from the lower part of the muffle tube 13, and is cooled with air between the drawing furnace 11 and the heating furnace 21. The thermal conductivity λ (T=300 K) of He gas is 150 mW/(m·K), whereas the thermal conductivity λ (T=300 K) of air is 26 mW/(m·K).

The air-cooled optical fiber 3 is fed to the heating furnace 21, whereby a predetermined segment of the optical fiber 3 is heated and then is annealed at a predetermined cooling rate. The heating furnace 21 has a muffle tube 23 through which the optical fiber 3 passes, whereas the muffle tube 23 is set such that the total length L2 (m) of the optical fiber preform 2 in the drawing direction of the optical fiber preform 2 (the vertical direction in FIG. 1) satisfies:

$$L2 \geq V/8 \quad (2)$$

where V is the drawing rate (m/s). Also, the heating furnace 21 is disposed such that the muffle tube 23 is set at a position where the optical fiber immediately before entering the muffle tube 23 has a temperature (entering temperature) within the range of 1400 to 1800° C., while satisfying the following relationship with respect to the drawing furnace 11:

$$L1 \leq 0.2 \times V \quad (3)$$

where L1 is the distance (m) from the lower end of the heater 12 in the drawing furnace 11 to the upper end of the muffle tube 23, and V is the drawing rate (m/s). The temperature of a heater 22 in the heating furnace 21 is set such that the inner peripheral face of the muffle tube 23 (the surface facing the surface of the optical fiber preform 2 or optical fiber 3) attains a surface temperature within the range of 1200 to 1600° C., 1300 to 1500° C. in particular.

When the position and length of the heating furnace 21 (muffle tube 23) are set as mentioned above, a segment where the optical fiber 3 drawn upon heating yields a temperature difference of 50° C. or more, e.g., a part where the temperature of the optical fiber 3 ranges from 1400 to 1600° C. (a segment yielding a temperature difference of 200° C.), in a portion where the temperature of the optical fiber 3 ranges from 1300 to 1700° C. is annealed at a cooling rate of 1000° C./s or less. When the surface temperature of inner peripheral face of the muffle tube 23 (the surface facing the surface of the optical fiber preform 2 or optical fiber 3) is set to a temperature within the range of 1300 to 1500° C., a segment where the optical fiber 3 drawn upon heating yields a temperature difference of 50° C. or more in a portion where the temperature of the optical fiber 3 ranges from 1400 to 1600° C. is annealed at a cooling rate of 1000° C./s or less.

The muffle tube 23 of the heating furnace 21 is configured such that an $N_2$ gas supply passage 25 from an $N_2$ gas supply section 24 is connected thereto, so as to supply $N_2$ gas as a second gas into the muffle tube 23 of the heating furnace 21, whereby an $N_2$ gas atmosphere is attained within the muffle tube 23. $N_2$ gas has a thermal conductivity lower than that of He gas, thereby acting to slow down the cooling rate of optical fiber. The thermal conductivity λ (T=300 K) of $N_2$ gas is 26 mW/(m·K). A gas having a relatively high molecular weight such as air or Ar, and the like can be used in place of $N_2$ gas. When a carbon heater is employed, it is necessary to use an inert gas as a matter of course.

$N_2$ gas is supplied into an upper portion of the drawing furnace 11 (muffle tube 13) so as to flow downward the drawing furnace 11. $N_2$ gas is discharged from a gap (a first gas exit section) disposed between the drawing furnace 11 and the heating furnace 21. The downward flow of $N_2$ gas prevents the silica-dust from adhering to the preform 2. Therefor, the reduction in strength of the preform 2 can be prevented.

The outer diameter of the optical fiber 3 let out of the heating furnace 21 is measured online by an outer diameter meter 33 acting as outer diameter measuring means, and its measured value is fed back to a driving motor 35 for driving a drum 34 to rotate, whereby the outer diameter is controlled so as to become constant. An output signal from the outer diameter meter 33 is fed to a control unit 36 acting as control means, and the rotating speed of the drum 34 (driving motor 35) is determined by an arithmetic operation such that the outer diameter of the optical fiber 3 attains a predetermined value which has been set beforehand. From the control unit 36, an output signal indicative of the rotating speed of the drum 34 (driving motor 35) determined by the arithmetic operation is fed to a driving motor driver (not depicted). According to the output signal from the control unit 36, the driving motor driver controls the rotating speed of the driving motor 35.

Thereafter, a coating die 38 coats the optical fiber 3 with a UV resin 39, and a UV lamp 32 in the resin curing section 31 cures the UV resin 39, thereby yielding a coated optical fiber 4. Then, by way of a guide roller 51, the coated optical fiber 4 is taken up by the drum 34. The drum 34 is supported by a rotary driving shaft 37, whereas an end part of the rotary driving shaft 37 is connected to the driving motor 35. Here, the coating die 38 and resin curing section 31 constitute the resin coating section in each claim. The resin coating section may be configured so as to apply a thermosetting resin, which is then cured by the heating furnace.

With reference to FIG. 2, results of experiments in conformity to the apparatus and method for making an optical fiber in accordance with the first embodiment carried out by using the above-mentioned drawing apparatus 1 (where the drawing furnace 11 has a muffle tube extension with a length (L3) of 0.07 m) will now be explained. These experiments have the following common conditions. As the optical fiber preform 2, one having an outer diameter of 50 mm was used, and an optical fiber 3 having an outer diameter of 125 μm was drawn from the optical fiber preform 2. The temperature of the drawing furnace was such that the surface temperature of the inner peripheral face of the muffle tube was about 2000° C. In the following experimental examples (Examples 1 and 2 and Comparative Examples 1 to 3), the temperature of the optical fiber 3 refers to the surface temperature of the optical fiber 3. The difference in temperature between the surface of the optical fiber 3 and the inside thereof is about 20 to 100° C. The temperatures of the drawing furnace 11 and heating furnace 21 refer to the surface temperatures of the inner peripheral faces of the muffle tubes 13, 23 (facing the surface of the optical fiber preform 2 or optical fiber 3).

Examples 1 and 2 are examples in conformity to the apparatus and method for making an optical fiber in accordance with the above-mentioned first embodiment, whereas Comparative Examples 1 to 3 are comparative examples carried out for comparison with the above-mentioned Examples in conformity to the apparatus and method for making an optical fiber in accordance with the first embodiment.

EXAMPLE 1

Figures 3A, 3B:
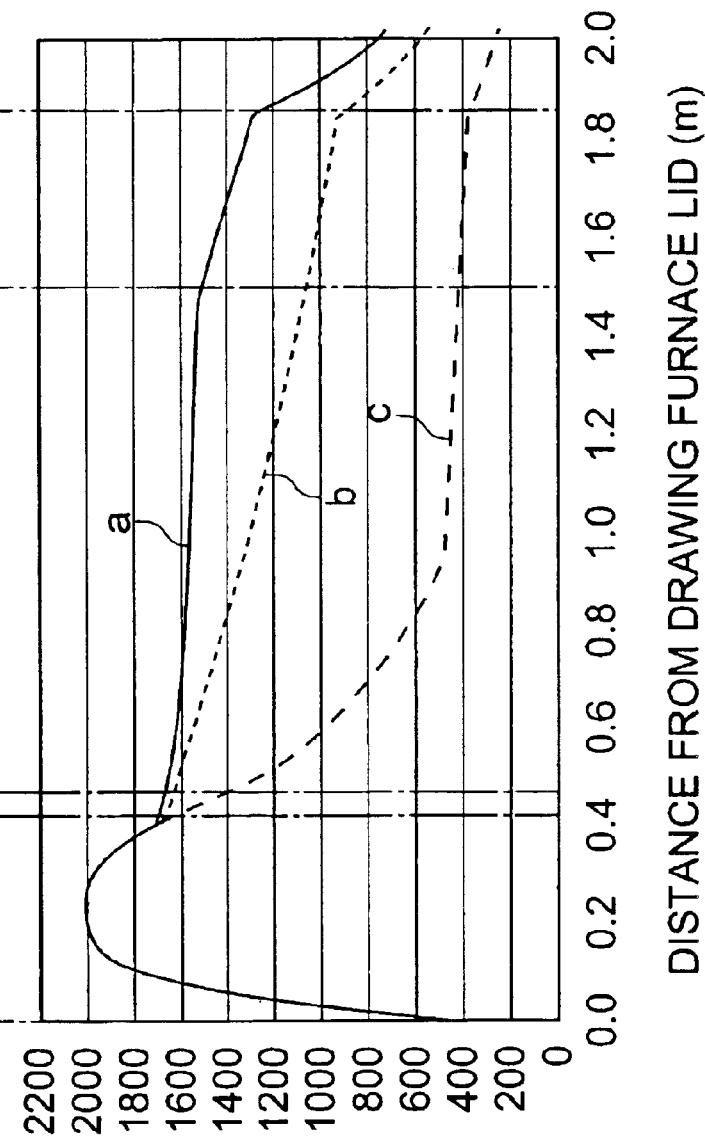
FIG. 3A is a schematic diagram showing the first embodiment of the apparatus and method for making an optical fiber in accordance with the present invention.
FIG. 3B is a graph showing temperature distributions of optical fibers in Examples in conformity to the first embodiment of the apparatus and method for making an optical fiber in accordance with the present invention and Comparative Examples.

Using a heating furnace having a muffle tube (with an inner peripheral diameter of about 30 mm) in which L1=0.4 m and L2 =1.0 m, an optical fiber was drawn. The distance (L4) between the drawing furnace and the heating furnace was set to 0.05 m. The optical fiber preform to be drawn had a core portion constituted by pure silica glass, and a cladding portion constituted by fluorine-doped glass. The drawing rate was 4 m/s, the drawing tension was 0.245 N (25 gf), and the temperature of the heating furnace (the surface temperature of the inner peripheral face of the muffle tube) was 1400° C. The temperature (entering temperature) of the optical fiber immediately before entering the heating furnace was about 1600° C. in terms of the surface temperature of optical fiber. As can be seen from characteristic a in FIG. 3B, the optical fiber had such a temperature distribution (calculated value) that it was annealed as being held at a temperature of 1600° C. or thereabout within the heating furnace 21. Here, in the heating furnace, a part of the drawn optical fiber where the temperature ranged from 1550 to 1650° C. was supposed to have been cooled at an annealing rate of about 600 to 800° C./s in a segment of 1.0 m which was the total length of the heating furnace. As shown in FIG. 3a, a forcible cooling section 61 was provided with a gap with respect to the heating furnace, whereby the annealed optical fiber 3 was forcibly cooled in the forcible cooling section 61.

Upon measurement, the transmission loss (with respect to light having a wavelength of 1.55 $\mu$m) of the drawn optical fiber was 0.170 dB/km. The Rayleigh scattering coefficient determined from measured data of wavelength characteristics of transmission loss was 0.84 dB$\mu$m$^4$/km. The outer diameter of the drawn optical fiber was 125±0.1 $\mu$m.

EXAMPLE 2

Using a heating furnace having a muffle tube (with an inner peripheral diameter of about 30 mm) in which L1=0.4 m and L2=2.0 m, an optical fiber was drawn. The distance (L4) between the drawing furnace and the heating furnace was set to 0.05 m. The optical fiber preform to be drawn had a core portion constituted by Ge-doped silica glass, and a cladding portion constituted by silica glass. The relative refractive index difference $\Delta$n between the core portion and cladding portion was 0.36%. The drawing rate was 8 m/s, the drawing tension was 0.785 N (80 gf), and the temperature of the heating furnace (the surface temperature of the inner peripheral face of the muffle tube) was 1400° C. The temperature (entering temperature) of the optical fiber immediately before entering the heating furnace was about 1600° C. in terms of the surface temperature of optical fiber. Here, in the heating furnace, a part of the drawn optical fiber where the temperature ranged from 1500 to 1600° C. was supposed to have been cooled at an annealing rate of about 500 to 700° C./s in a segment of 2.0 m which was the total length of the heating furnace.

Upon measurement, the transmission loss (with respect to light having a wavelength of 1.55 $\mu$m) of the drawn optical fiber was 0.182 dB/km. The Rayleigh scattering coefficient determined from measured data of wavelength characteristics of transmission loss was 0.92 dB$\mu$m$^4$/km. The outer diameter of the drawn optical fiber was 125±0.1 $\mu$m.

COMPARATIVE EXAMPLE 1

Using a heating furnace having a muffle tube (with an inner peripheral diameter of about 30 mm) in which L1=0.4 m and L2=1.0 m, an optical fiber was drawn. The distance (L4) between the drawing furnace and the heating furnace was set to 0.05 m. The optical fiber preform to be drawn had a core portion constituted by pure silica glass, and a cladding portion constituted by fluorine-doped silica glass. The drawing rate was 4 m/s, and the drawing tension was 0.245 N (25 gf). No heating was carried out in the heating furnace, whereas He gas was supplied into the heating furnace (muffle tube) instead of $N_2$ gas. As can be seen from characteristic c in FIG. 3B, the temperature distribution (calculated value) of the optical fiber was such that the optical fiber let out of the drawing furnace was cooled at a cooling rate of about 30000° C./s.

Upon measurement, the transmission loss (with respect to light having a wavelength of 1.55 $\mu$m) of the drawn optical fiber was 0.18 dB/km. The Rayleigh scattering coefficient determined from measured data of wavelength characteristics of transmission loss was 0.9 dB$\mu$m$^4$/km.

COMPARATIVE EXAMPLE 2

Using a heating furnace having a muffle tube (with an inner peripheral diameter of about 30 mm) in which L1=0.4 m and L2=1.0 m, an optical fiber was drawn. The distance (L4) between the drawing furnace and the heating furnace was set to 0.05 m. The optical fiber preform to be drawn had a core portion constituted by pure silica glass, and a cladding portion constituted by fluorine-doped silica glass. The drawing rate was 4 m/s, and the drawing tension was 0.245 N (25 gf). No heating was carried out in the heating furnace. $N_2$ gas was supplied into the heating furnace (muffle tube). As indicated by characteristic b in FIG. 3B, the temperature distribution (calculated value) of the optical fiber was such that the optical fiber let out of the drawing furnace was cooled at a cooling rate of about 4000 to 5000° C./s.

Upon measurement, the transmission loss (with respect to light having a wavelength of 1.55 $\mu$m) of the drawn optical fiber was 0.174 dB/km. The Rayleigh scattering coefficient determined from measured data of wavelength characteristics of transmission loss was 0.86 dB$\mu$m$^4$/km.

COMPARATIVE EXAMPLE 3

Using a heating furnace having a muffle tube (with an inner peripheral diameter of about 30 mm) in which L1=0.4 m and L2=1.0 m, an optical fiber was drawn. The distance (L4) between the drawing furnace and the heating furnace was set to 0.05 m. The optical fiber preform to be drawn had a core portion constituted by pure silica glass, and a cladding portion constituted by fluorine-doped silica glass. The drawing rate was 4 m/s, the drawing tension was 0.245 N (25 gf), and the temperature of the heating furnace (the surface temperature of the inner peripheral face of the muffle tube) was 1400° C. $N_2$ gas was supplied into the heating furnace (muffle tube) instead of He gas.

Upon measurement, the transmission loss (with respect to light having a wavelength of 1.55 $\mu$m) of the drawn optical fiber was 0.170 dB/km. The Rayleigh scattering coefficient determined from measured data of wavelength characteristics of transmission loss was 0.84 dB$\mu$m$^4$/km. The outer diameter of the drawn optical fiber was 125±0.3 $\mu$m.

As in the foregoing, Example 1 yielded a Rayleigh scattering coefficient of 0.84 dB$\mu$m$^4$/km and a transmission loss of 0.17 dB/km with respect to light having a wavelength of 1.55 $\mu$m, so that the transmission loss was reduced by lowering the Rayleigh scattering loss as compared with Comparative Examples 1 and 2 yielding a Rayleigh scattering coefficient of 0.86 to 0.9 dB$\mu$m$^4$/km and a transmission loss of 0.174 to 0.18 dB/km with respect to light having a wavelength of 1.55 $\mu$m in Comparative Examples 1 and 2. On the other hand, Example 2 yielded a Rayleigh scattering coefficient of 0.92 dB$\mu$m$^4$/km and a transmission loss of 0.182 dB/km with respect to light having a wavelength of 1.55 $\mu$m, thereby fully reducing the transmission loss as a Ge-containing single-mode optical fiber.

In Examples 1 and 2, the outer diameter of the drawn optical fiber was 125±0.1 $\mu$m, whereby the fluctuation in outer diameter of the optical fiber was suppressed as compared with that of 125±0.3 $\mu$m in Comparative Example 3, whereby stable drawing was possible.

Thus, as can be seen from the results of experiments mentioned above, the heating furnace 21 for heating a predetermined segment of the optical fiber 3 and annealing it at a predetermined cooling rate is disposed between the drawing furnace 11 and the resin curing section 31 (coating die 38), the He gas supply passage 15 from the He gas supply section 14 is connected to the muffle tube 13 of the drawing furnace 11 so as to supply He gas into the muffle tube 13, and the N$_2$ gas supply passage 25 from the N$_2$ gas supply section 24 is connected to the muffle tube 23 of the heating furnace 21 so as to supply N$_2$ gas into the muffle tube 23, whereby an He gas atmosphere is attained within the muffle tube 13 while an N$_2$ gas atmosphere is attained within the muffle tube 23. Therefore, the atmosphere gas for the optical fiber 3 within the heating furnace 21 has a lower thermal conductivity (N$_2$ gas yields a thermal conductivity $\lambda$ (T=300 K) of 26 mW/(m·K)), so that the cooling rate of the optical fiber before being coated with the UV resin 39 after being drawn upon heating is slowed down in a predetermined segment, whereby the virtual temperature of the optical fiber 3 decreases, thus reducing the randomness in atomic arrangement. Consequently, it is possible to make, in a very short period of time between the drawing upon heating and the coating with the UV resin 39, the optical fiber 3 whose transmission loss is reduced by lowering its Rayleigh scattering intensity. Since the Rayleigh scattering intensity is reduced by controlling the cooling rate of the optical fiber 3 before being coated with a resin after being drawn, the heat treatment for reheating such as that in the above-mentioned prior art is unnecessary, whereby this embodiment can be applied quite easily to the mass production of the coated optical fiber 4 whose surface is coated with the UV resin 39 cured thereon. Also, since the atmosphere gas for the optical fiber 3 within the drawing furnace 11 has a thermal conductivity higher than that of the atmosphere gas within the heating furnace (He gas yields a thermal conductivity $\lambda$ (T=300 K) of 150 mW/(m·K)), the optical fiber preform 2 is softened upon heating and rapidly cooled until it approximates a predetermined diameter, whereby the outer diameter of optical fiber can be restrained from fluctuating.

Since the heating furnace 21 is disposed with a gap with respect to the drawing furnace 11, so that the optical fiber 3 is let out of the drawing furnace 11 from the lower part of the muffle tube 13 and is cooled with air between the drawing furnace 11 and heating furnace 21 before entering the heating furnace 21, the occurrence of such a state that He gas flows into the heating furnace 21 (into the muffle tube 23) or N$_2$ gas flows into the drawing furnace 11 (into the muffle tube 13) is suppressed, whereby the thermal conductivity of He gas within the drawing furnace 11 and the thermal conductivity of N$_2$ gas with in the heating furnace 21 are maintained appropriately. As a consequence, the optical fiber 3 whose transmission loss is lowered while its outer diameter is restrained from fluctuating can be made stably.

When the muffle tube 23 of the heating furnace 21 is located at a position where the temperature (entering temperature) of the optical fiber immediately before entering the muffle tube 23 falls within the range of 1400 to 1800° C., a predetermined segment of the portion of optical fiber 3 yielding a temperature of 1300 to 1700° C. before being coated with the UV resin 39 can securely be heated, so as to appropriately slow down the cooling rate in this portion. Since the cooling rate is slowed down in a predetermined segment in the portion of optical fiber 3 yielding a temperature of 1300 to 1700° C., the virtual temperature of the optical fiber 3 decreases, whereby the Rayleigh scattering loss can further be reduced.

When the muffle tube 23 of the heating furnace 21 is located at a position satisfying the above-mentioned expression (3), a predetermined segment of the portion of optical fiber 3 yielding a temperature of 1300 to 1700° C. before being coated with the UV resin 39 after being drawn upon heating in the drawing furnace 11 can securely be heated, so as to appropriately slow down the cooling rate in this portion.

When the muffle tube 23 of the heating furnace 21 has a total length satisfying the above-mentioned expression (2), a predetermined segment of the portion of optical fiber 3 yielding a temperature of 1300 to 1700° C. before being coated with the UV resin 39 after being drawn upon heating in the drawing furnace 11 can securely be heated, so as to appropriately slow down the cooling rate in this portion.

Since the He gas atmosphere is attained within the muffle tube 13 of the drawing furnace 11 while the optical fiber 3 is cooled with air between the drawing furnace 11 and the heating furnace 21 such that its part before entering the heating furnace 21 (the part of optical fiber 3 yielding a temperature of 1700° C. or higher) is cooled at a cooling rate of 4000° C./s or higher, the height of equipment required for cooling the optical fiber 3 can be lowered when the drawing speed is high. Since the structural relaxation of atoms proceeds in a very short period of time at a temperature higher than 1700° C., the equilibrium state at each temperature can be maintained even when cooled at a cooling rate of 4000° C./s or higher, which exerts no influence on the Rayleigh scattering intensity.

Since the outer diameter meter 33 for measuring the outer diameter of the optical fiber 3 let out of the heating furnace 21 and the control unit 36 for controlling the rotating speed of the drum 34 (driving motor 35) in response to the output signal from the outer diameter meter 33 such that the outer diameter of the optical fiber 3 attains a predetermined value are provided, the outer diameter of the optical fiber 3, whose outer diameter length is in a stable state, let out of the heating furnace 21 can be measured, so that the rotating speed of the drum 34 (driving motor 35) can be controlled according to this stable outer diameter, whereby the drawing speed of the optical fiber 3 can be controlled appropriately.

As a modified example of the first embodiment, the heater 22 of the heating furnace 21 may be constituted by a plurality of heaters, which are arranged in the direction of drawing the optical fiber preform (downward in FIG. 1) so as to yield such a temperature gradient that a higher temperature is attained on the drawing furnace 11 side whereas a lower temperature is attained on the resin curing section 31 (coating die 38) side. The optical fiber 3 drawn upon heating in the drawing furnace 11 has such a temperature distribution that the temperature decreases from the drawing furnace 11 side to the resin curing section 31 (coating die 38) side. Therefore, when a plurality of heaters are provided so as to yield such a temperature gradient that a higher temperature is attained on the drawing furnace 11 side whereas a lower temperature is attained on the resin curing section 31 (coating die 38) side, the inside of the muffle tube 23 has a temperature distribution corresponding to the temperature of the optical fiber 3, thereby appropriately keeping the temperature difference with respect to the optical fiber 3, which makes it possible to cool the optical fiber 3 at a further suitable cooling rate.

As another modified example, the heating furnace 21 may be provided integrally with the drawing furnace 11 in a continuous fashion. The case where the heating furnace 21 is provided integrally with the drawing furnace 11 in a continuous fashion as such also enables the making of the optical fiber 3 whose transmission loss is reduced by lowering the Rayleigh scattering coefficient.

Second Embodiment

A second embodiment of the apparatus and method for making an optical fiber in accordance with the present invention will now be explained with reference to FIG. 4.

A drawing apparatus 101 is a drawing apparatus for silica type optical fibers, having a drawing furnace 11, a heating furnace 121 for annealing, and a resin curing section 31 which are disposed in this order in the drawing direction of an optical fiber preform 2 (downward in FIG. 1). The optical fiber preform 2 held by a preform supply apparatus (not depicted) is supplied to the drawing furnace 11, and the lower end of the optical fiber preform 2 is heated and softened by a heater 12 within the drawing furnace 11, whereby an optical fiber 3 is drawn. The drawing furnace 11 has a muffle tube 13 configured such that a gas supply passage 115 from a first gas supply section 114 is connected thereto, so that an atmosphere constituted by a first gas is attained within the muffle tube 13 of the drawing furnace 11. The optical fiber 3 drawn upon heating is cooled to about 1900° C. by the first gas within the muffle tube 13. Thereafter, the optical fiber 3 is let out of the drawing furnace 11 from a muffle tube extension 16. As the first gas, inert gases such as $N_2$ gas and He gas can be used, for example. The thermal conductivity λ (T=300 K) of $N_2$ gas is 26 mW/(m·K), whereas the thermal conductivity λ (T=300 K) of He gas is 150 mW/(m·K).

The heating furnace 121 is disposed with a gap L5 with respect to the drawing furnace 11, and has a heater 122 and a muffle tube 123. The heating furnace 121 anneals a predetermined part of the optical fiber 3 at a predetermined cooling rate by heating the optical fiber 3 within the muffle tube 123 with the heater 122. The annealing in the heating furnace 121 is carried out such that a segment where the optical fiber 3 drawn upon heating yields a temperature difference of 50° C. or more, e.g., a part where the temperature of the optical fiber 3 ranges from 1400 to 1600° C. (a segment yielding a temperature difference of 200° C.), in a portion where the temperature of the optical fiber 3 ranges from 1200 to 1700° C. is annealed at a cooling rate of 1000° C./s or less. When the temperature of the furnace center is set so as to fall within the range of 1300 to 1600° C., a segment where the optical fiber 3 attains a temperature difference of 50° C. or more is annealed at a cooling rate of 1000° C./s or less in the portion of optical fiber 3 yielding a temperature of 1400 to 1600° C.

The installing positions of the heater 122 and muffle tube 123 in the heating furnace 121 and the total length thereof in the drawing direction of the optical fiber preform 2 (in the vertical direction of FIG. 4) are set in view of the drawing speed. Here, it is necessary to take account of the drawing speed because of the fact that the position yielding the same temperature in the optical fiber 3 shifts downward as the drawing rate increases. The temperature of the heater 122 in the heating furnace 121 is set such that the segment in which the optical fiber 3 located within the muffle tube 123 attains a temperature difference of 50° C. or more is cooled at a cooling rate of 1000° C./s or less.

The muffle tube 123 of the heating furnace 121 is configured so as to communicate with the outside air, whereby an atmosphere constituted by air (second gas) is attained within the muffle tube 123. The thermal conductivity λ (T=300 K) of air is 26 mW/(m·K). A gas having a relatively large molecular weight such as $N_2$ or Ar can be used in place of air. When a gas such as $N_2$ or Ar is used as the second gas, the gas supply section as a source for supplying the second gas is configured so as to be connected to the muffle tube 123 by way of the gas supply passage.

The heater 122 includes three heaters constituted by a first heater 122a, a second heater 122b, and a third heater 122c. The first heater 122a, second heater 122b, and third heater 122c are successively arranged in this order in the drawing direction of the optical fiber preform 2 (downward in FIG. 4). The respective temperatures of the heaters 122a, 122b, 122c are adjusted so as to satisfy:

$$T1=T2+25° C. \quad (4)$$

$$T3=T2-25° C. \quad (5)$$

where T1 is the surface temperature of the inner peripheral face of the muffle tube 123 at a position corresponding to the first heater 122a; T2 is the surface temperature of the inner peripheral face of the muffle tube 123 at a position corresponding to the second heater 122b; and T3 is the surface temperature of the inner peripheral face of the muffle tube 123 at a position corresponding to the third heater 122c. The temperature difference between T1 and T2 or the temperature difference between T2 and T3 is not restricted to 25° C., but may be about 30° C., for example. All the heaters may be set to the same temperature as well.

When temperature differences are provide between the heaters 122a, 122b, 122c as mentioned above, a temperature gradient is formed within the muffle tube 123 of the heating furnace 121 such that the first heater 122a on the drawing furnace 11 side and the third heater 122c on the resin curing section 31 side attain higher and lower temperatures, respectively. Therefore, the inside of the muffle tube 123 has a temperature distribution corresponding to the temperature distribution of the optical fiber 3 in which the temperature decreases from the drawing furnace 11 side to the resin curing section 31 side, whereby the temperature difference with respect to the optical fiber 3 can be kept more appropriately, and the optical fiber 3 can be cooled at a further suitable cooling rate.

Figure 4:
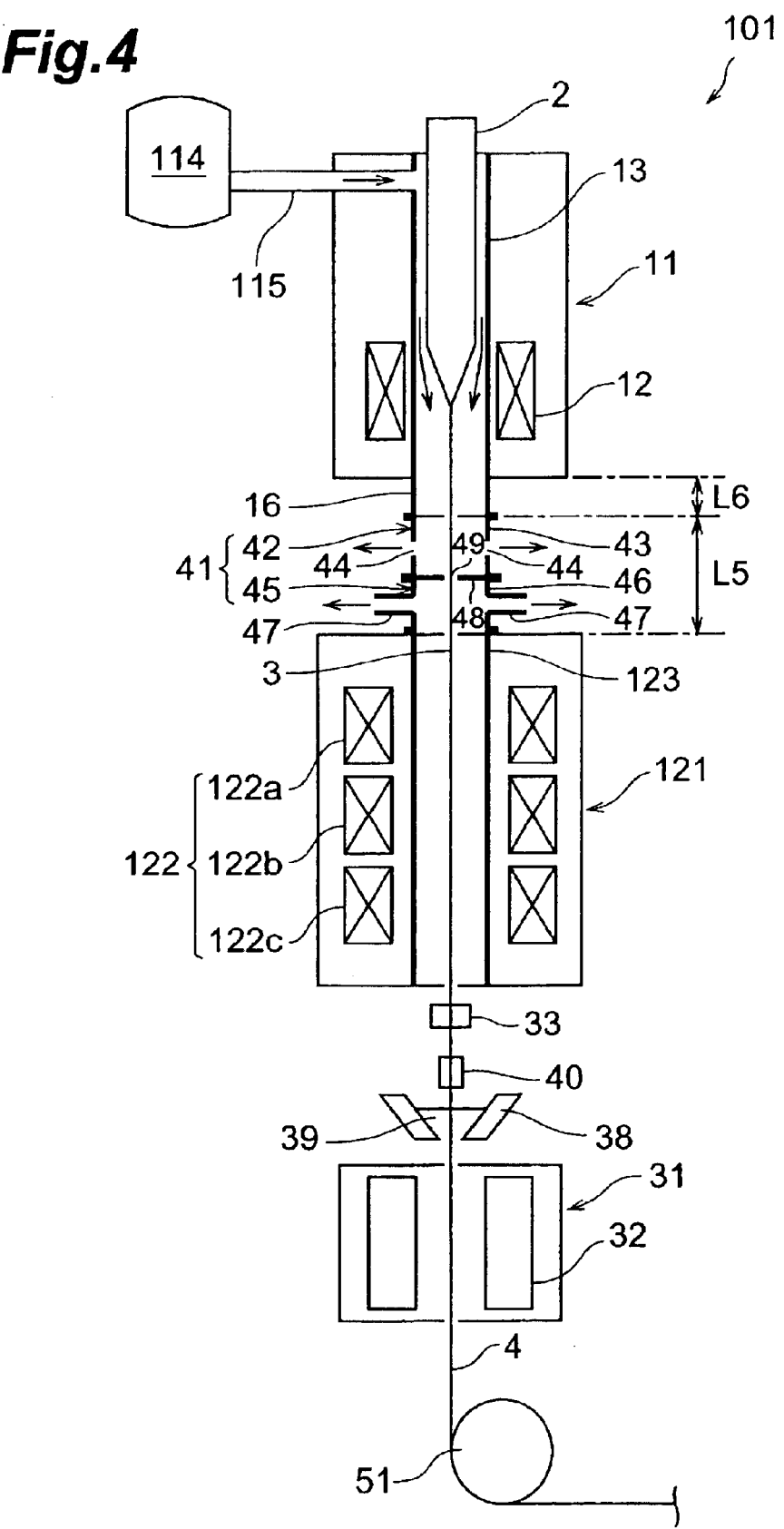
FIG. 4 is a schematic diagram showing a second embodiment of the apparatus and method for making an optical fiber in accordance with the present invention.

A buffer chamber 41 acting as a gas mixture layer is disposed between the muffle tube extension 16 and the heating furnace 121, whereas the length of the buffer chamber 41 in the drawing direction of the optical fiber 3 is substantially L5 as shown in FIG. 4. A slight gap exists between the muffle tube extension 16 and the buffer chamber 41, so that the muffle tube extension 16 and the buffer chamber 41 are not directly connected to each other. The buffer chamber 41 is constituted by a first buffer cell 42 and a second buffer cell 45. In the inner space of the buffer chamber 41 (the first buffer cell 42 and second buffer cell 45), the first gas as the atmosphere gas within the drawing furnace 11 (muffle tube 13) and air as the atmosphere gas within the heating furnace 121 (muffle tube 123) exist in a mixed state.

The first buffer cell 42 has a barrier 43 for separating the inner space, through which the optical fiber 3 passes, from the outside air, whereas the barrier 43 is formed with a plurality of exit holes 44 acting as a gas exit section for letting out the first gas flowing from within the drawing furnace 11 and the dust occurring within the drawing furnace 11. The second buffer cell 45 has a barrier 46 for separating the inner space, through which the optical fiber 3 passes, from the outside air, whereas the barrier 46 is formed with a plurality of exit tubes 47 acting as a gas exit section for letting out the second gas flowing from within the drawing furnace 11 and the dust occurring within the drawing furnace 11. The first buffer cell 42 and the second buffer cell 45 are separated from each other by a partition wall 48. The partition wall 48 is formed with an optical fiber passing hole 49 though which the optical fiber 3 passes. A supply tube for supplying $N_2$ gas and the like may be connected to the second buffer cell 45 so as to supply $N_2$ gas and the like from the supply tube, thereby positively letting out the first gas flowing from within the drawing furnace 11 and the dust occurring within the drawing furnace 11.

The optical fiber 3 let out of the drawing furnace 11 from the muffle tube extension 16 subsequently enters the buffer chamber 41 (the first buffer cell 42 and second buffer cell 45), and then enters the heating furnace 121 so as to be annealed therein while in a state restrained from coming into contact with the outside air by the buffer chamber 41 (the first buffer cell 42 and second buffer cell 45). The entering temperature of the optical fiber 3 with respect to the buffer chamber 41 (the first buffer cell 42) falls within the range of 1400 to 1900° C. so as not to hinder a segment where the optical fiber 3 attains a temperature difference of 50° C. or more in the portion of optical fiber 3 yielding a temperature of 1200 to 1700° C. in the heating furnace 121 from being annealed.

The outer diameter of the optical fiber 3 let out of the heating furnace 121 is measured online by an outer diameter meter 33, and its measured value is fed back to a driving motor (not depicted) for driving an optical fiber take-up device (not depicted) to rotate, whereby the outer diameter is controlled so as to become constant. Preferably, the outer diameter meter is installed downstream the heating furnace 121 as such. This is because of the fact that, if the outer diameter meter 33 is installed directly below the drawing furnace 11, the temperature of the optical fiber 3 will decrease there so much that effects of annealing may be lost.

Thereafter, the optical fiber 3 is cooled to about several ten ° C. by a forcible cooling unit 40. The forcible cooling unit 40 is configured such that a gas (e.g., He gas) at a room temperature or lower is caused to flow through a thin, elongated pipe through which the optical fiber 3 passes. The optical fiber 3 cooled by the forcible cooling unit 40 is coated with a UV resin 39 by a coating die 38, and the UV resin 39 is cured by a UV lamp 32 in the resin curing section 31, whereby a coated optical fiber 4 is obtained. By way of a guide roller 51, the coated optical fiber 4 is taken up by a drum. A thermosetting resin may be used in place of the UV resin, so as to be cured by the heating furnace.

With reference to FIG. 5, results of experiments in conformity to the apparatus and method for making an optical fiber in accordance with the second embodiment carried out by using the above-mentioned drawing apparatus 101 will now be explained. These experiments have the following common conditions. An optical fiber 3 having an outside diameter of 125 μm was drawn from the optical fiber preform 2. The temperature of the drawing furnace was such that the surface temperature of the inner peripheral face of the muffle tube (facing the surface of the optical fiber preform 2 or optical fiber 3) was about 2000° C., whereas the drawing rate was 400 m/min.

Examples 3 to 5 are examples in conformity to the apparatus and method for making an optical fiber in accordance with the above-mentioned second embodiment, whereas Comparative Examples 4 to 6 are comparative examples carried out for comparison with the above-mentioned Examples in conformity to the apparatus and method for making an optical fiber in accordance with the second embodiment.

EXAMPLE 3

Using a heating furnace with a muffle tube having an inner peripheral diameter of 20 mm and a total length of 1500 mm, an optical fiber was drawn. As the first gas, $N_2$ gas was used. The optical fiber preform to be drawn was one having a core portion constituted by pure silica glass and a cladding portion constituted by fluorine-doped glass, whose outer diameter was 40 mm. The buffer chamber 41 had a length L5 of 100 mm in the drawing direction of the optical fiber 3, whereas the muffle tube extension 16 had a length L6 of 50 mm in the drawing direction of the optical fiber 3. The heating furnace had a temperature (at the furnace center) of about 1500° C. The temperature (entering temperature) of the optical fiber immediately before entering the heating furnace was supposed to be 1800° C. in terms of the surface temperature of optical fiber. Therefore, in the heating furnace, the part of drawn optical fiber where the temperature was 1800 to 1600° C. was cooled at an annealing rate of about 890° C./s on average in a segment of 1500 mm which was the total length of the heating furnace.

Upon measurement, the transmission loss of the drawn optical fiber (with respect to light having a wavelength of 1.55 μm) was 0.167 dB/km, whereas the Rayleigh scattering coefficient determined from measured data of wavelength characteristics of transmission loss was 0.835 dB$\mu m^4$/km. Upon measurement, the outer diameter of the drawn optical fiber was 125±0.15 μm, whereby "glass diameter fluctuation" was ±0.15 μm. The number of occurrences of "spike" per 1000 km of the drawn optical fiber was 0, whereas "bending abnormality ratio" was 0%. As for "bending abnormality ratio," the radius of curvature was measured at different positions of the optical fiber, parts yielding a predetermined radius of curvature (4.2 m in this Example) or greater were defined defective, and the ratio of the number of positions where defects were detected to the number n of measured positions (n=10 in this Example) was expressed in terms of percentage.

EXAMPLE 4

Using a heating furnace with a muffle tube having an inner peripheral diameter of 20 mm and a total length of 1500 mm, as in Example 3, an optical fiber was drawn. As the first gas, He gas was used. The optical fiber preform to be drawn was one having a core portion constituted by pure silica glass and a cladding portion constituted by fluorine-doped glass, whose outer diameter was 80 mm. The buffer chamber 41 had a length L5 of 100 mm in the drawing direction of the optical fiber 3, whereas the muffle tube extension 16 had a length L6 of 50 mm in the drawing direction of the optical fiber 3. The heating furnace had a temperature (at the furnace center) of about 1500° C. The temperature (entering temperature) of the optical fiber immediately before entering the heating furnace was supposed to be 1720° C. in terms of the surface temperature of optical fiber. Therefore, in the heating furnace, the part of drawn optical fiber where the temperature ranged from 1720 to 1520° C. was cooled at an annealing rate of about 890° C./s on average in a segment of 1500 mm which was the total length of the heating furnace.

Upon measurement, the transmission loss of the drawn optical fiber (with respect to light having a wavelength of 1.55 $\mu$m) was 0.168 dB/km, whereas the Rayleigh scattering coefficient determined from measured data of wavelength characteristics of transmission loss was 0.84 dB$\mu$m$^4$/km. Upon measurement, the outer diameter of the drawn optical fiber was 125±0.15 $\mu$m, whereby "glass diameter fluctuation" was ±0.15 $\mu$m. The number of occurrences of "spike" per 1000 km of the drawn optical fiber was 0, whereas "bending abnormality ratio" was 0%.

COMPARATIVE EXAMPLE 4

Figure 6:
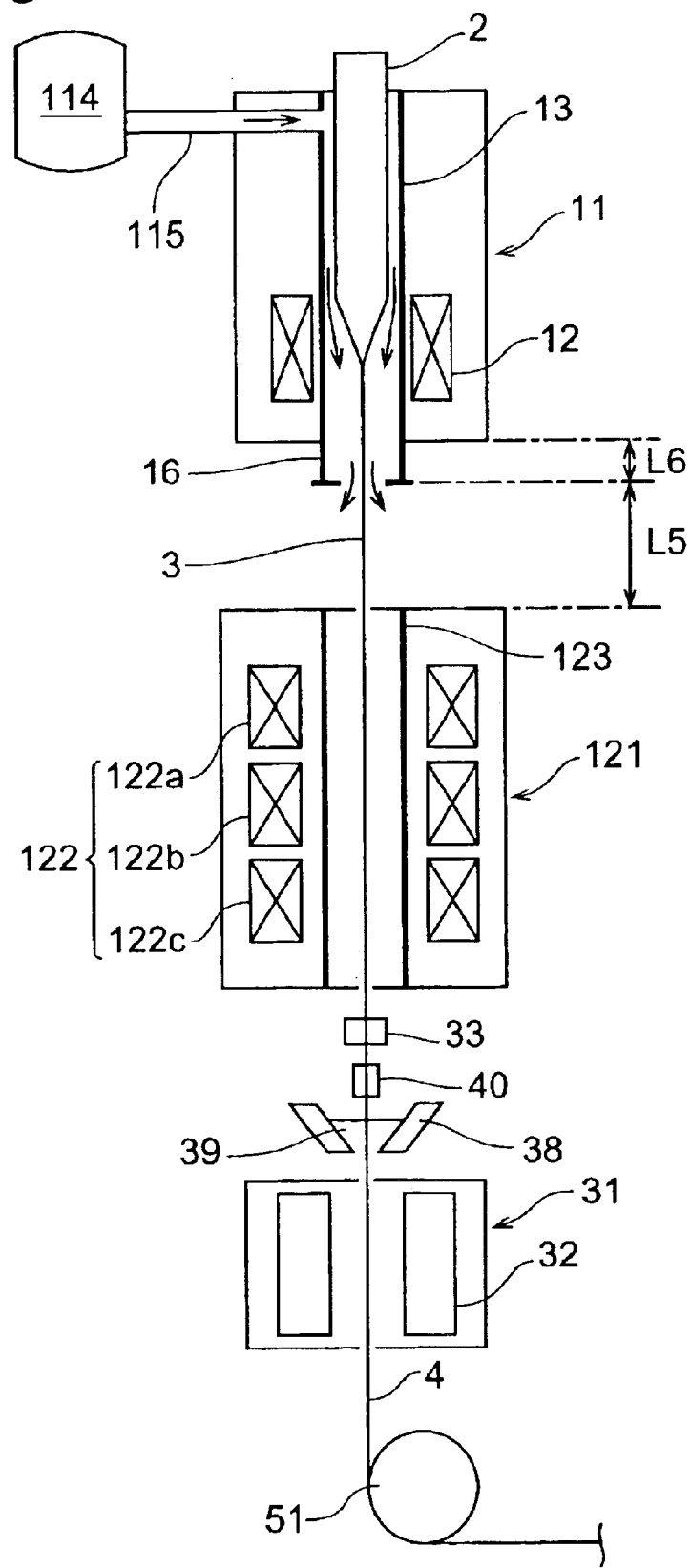
FIG. 6 is a schematic diagram showing the apparatus and method for making an optical fiber in Comparative Example 4.

As shown in FIG. 6, an optical fiber was drawn in a configuration lacking the buffer chamber 41 (first buffer cell 42 and second buffer cell 45). Experiment conditions other than that were the same as those of Example 3.

Upon measurement, the transmission loss of the drawn optical fiber (with respect to light having a wavelength of 1.55 $\mu$m) was 0.168 dB/km, whereas the Rayleigh scattering coefficient determined from measured data of wavelength characteristics of transmission loss was 0.84 dB$\mu$m$^4$/km. Upon measurement, the outer diameter of the drawn optical fiber was 125±0.8 $\mu$m, whereby "glass diameter fluctuation" was ±0.8 $\mu$m. The number of occurrences of "spike" per 1000 km of the drawn optical fiber was 0, whereas "bending abnormality ratio" was 20%.

COMPARATIVE EXAMPLE 5

Figure 7:
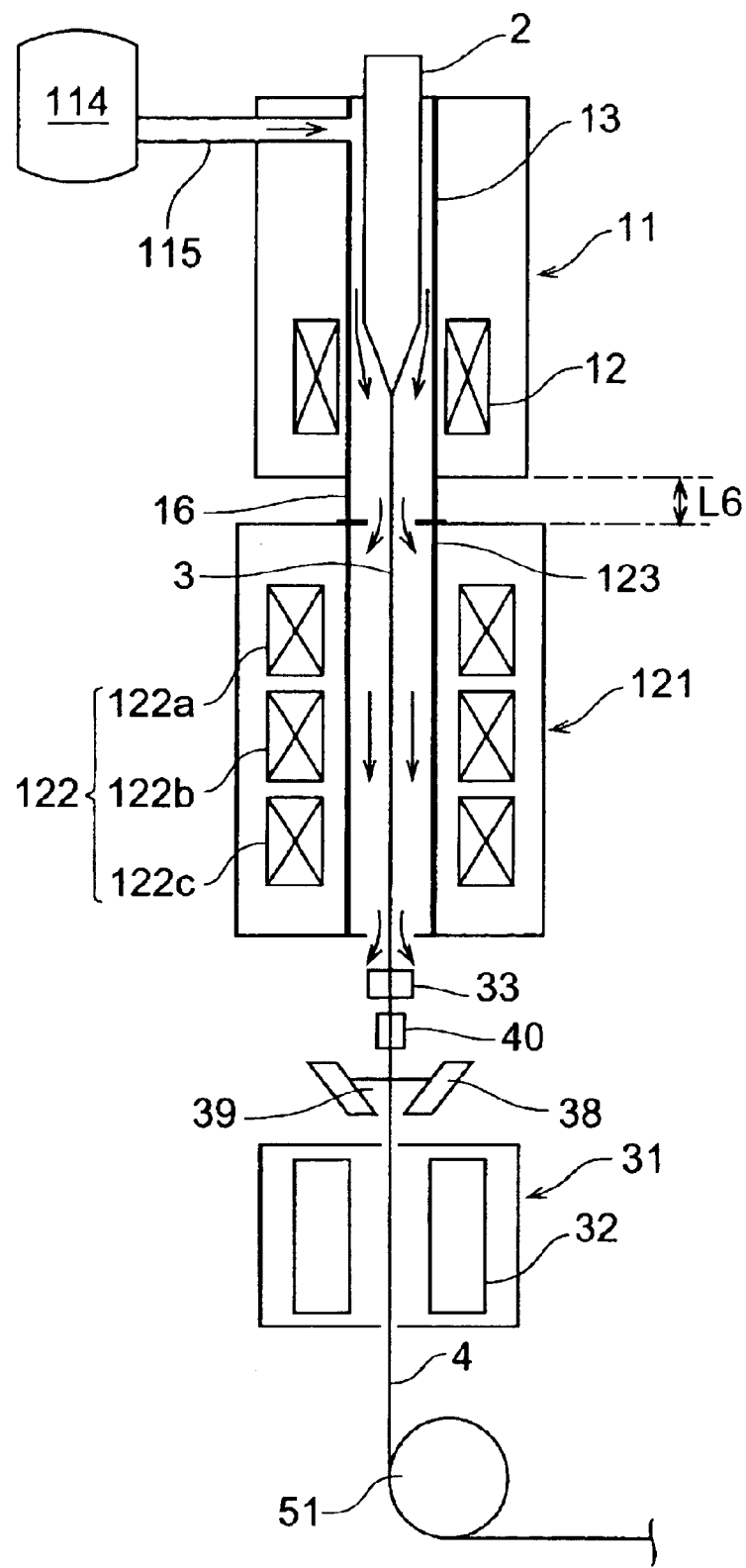
FIG. 7 is a schematic diagram showing the apparatus and method for making an optical fiber in Comparative Examples 5 and 6.
Figure 8:
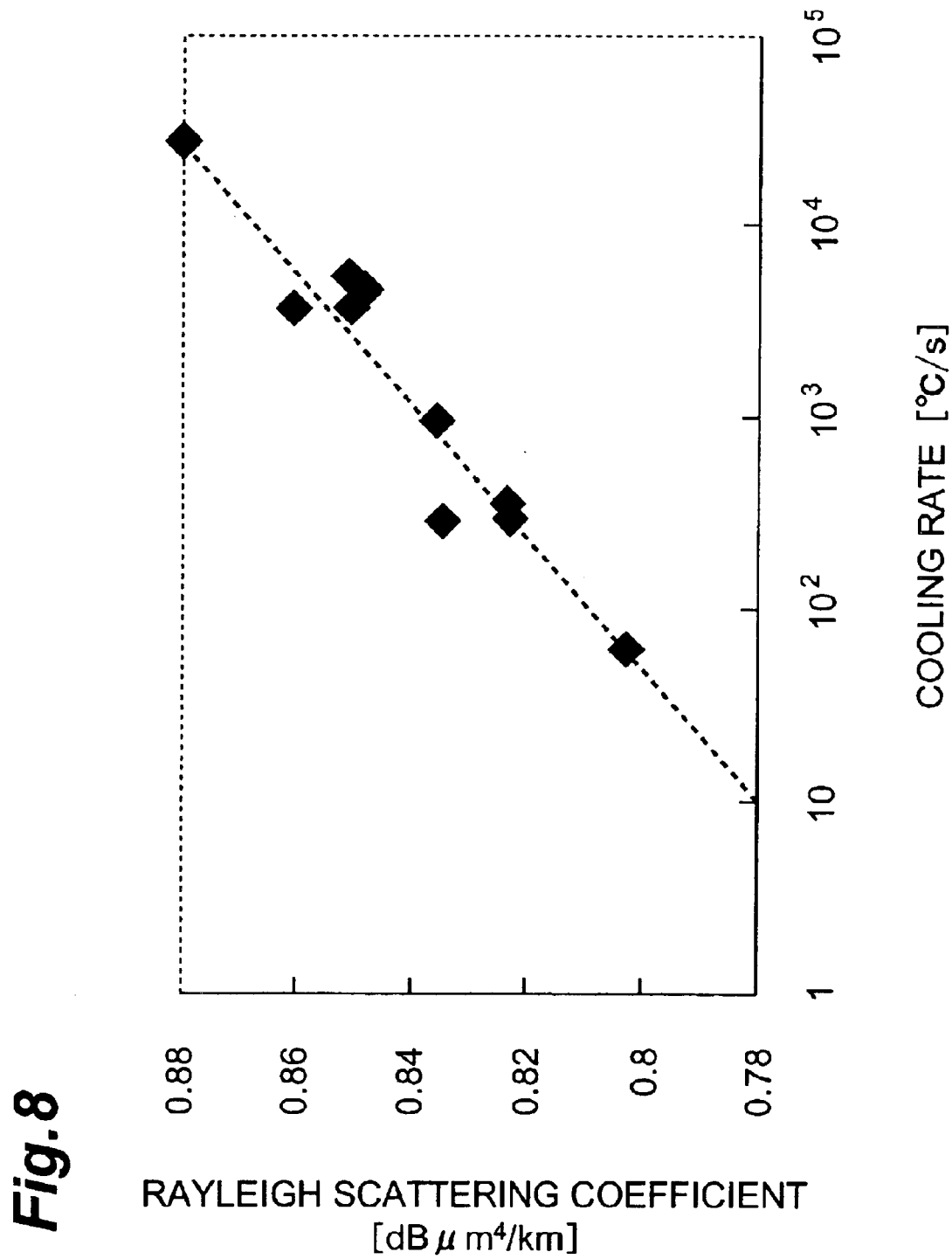
FIG. 8 is a graph showing the relationship between the cooling rate of optical fiber preform and the Rayleigh scattering coefficient.

As shown in FIG. 7, an optical fiber was drawn in a configuration in which the heating furnace 121 was directly connected to the muffle tube extension 16 in an airtight fashion. Experiment conditions other than that were the same as those of Example 3. However, since the heating furnace 11 was directly connected to the drawing furnace 11, $N_2$ gas flowed into the heating furnace 121 (muffle tube 123) from the drawing furnace 11, whereby an atmosphere constituted by $N_2$ gas was attained within the heating furnace 121 (muffle tube 123).

Upon measurement, the transmission loss of the drawn optical fiber (with respect to light having a wavelength of 1.55 $\mu$m) was 0.167 dB/km, whereas the Rayleigh scattering coefficient determined from measured data of wavelength characteristics of transmission loss was 0.835 dB$\mu$m$^4$/km. Upon measurement, the outer diameter of the drawn optical fiber was 125±0.15 $\mu$m, whereby "glass diameter fluctuation" was ±0.15 $\mu$m. The number of occurrences of "spike" per 1000 km of the drawn optical fiber was 12, whereas "bending abnormality ratio" was 0%.

COMPARATIVE EXAMPLE 6

An optical fiber was drawn in a state where no heating (annealing) was effected by the heating furnace 121 (heater 122) in the configuration of Comparative Example 5. Experiment conditions other than that were the same as those of Example 3. However, since the heating furnace 121 was directly connected to the drawing furnace 11 as in Comparative Example 5, $N_2$ gas flowed into the heating furnace 121 (muffle tube 123) from the drawing furnace 11, whereby an atmosphere constituted by $N_2$ gas was attained within the heating furnace 121 (muffle tube 123).

Upon measurement, the transmission loss of the drawn optical fiber (with respect to light having a wavelength of 1.55 $\mu$m) was 0.171 dB/km, whereas the Rayleigh scattering coefficient determined from measured data of wavelength characteristics of transmission loss was 0.855 dB$\mu$m$^4$/km. Upon measurement, the outer diameter of the drawn optical fiber was 125±0.15 $\mu$m, whereby "glass diameter fluctuation" was ±0.15 $\mu$m. The number of occurrences of "spike" per 1000 km of the drawn optical fiber was 1, whereas "bending abnormality ratio" was 0%.

EXAMPLE 5

An optical fiber was drawn while using He gas in place of air as the second gas in the configuration of Example 4. Experiment conditions other than that were the same as those of Example 4.

Upon measurement, the transmission loss of the drawn optical fiber (with respect to light having a wavelength of 1.55 $\mu$m) was 0.169 dB/km, whereas the Rayleigh scattering coefficient determined from measured data of wavelength characteristics of transmission loss was 0.845 dB$\mu$m$^4$/km. Upon measurement, the outer diameter of the drawn optical fiber was 125±0.15 $\mu$m, whereby "glass diameter fluctuation" was ±0.15 $\mu$m. The number of occurrences of "spike" per 1000 km of the drawn optical fiber was 0, whereas "bending abnormality ratio" was 0%.

As in the foregoing, Examples 3 and 4 yielded a Rayleigh scattering coefficient of 0.835 to 0.84 dB$\mu$m$^4$/km and a transmission loss of 0.167 to 0.168 dB/km with respect to light having a wavelength of 1.55 $\mu$m, thereby lowering the Rayleigh scattering coefficient and reducing the transmission loss as compared with Comparative Example 6 yielding a Rayleigh scattering coefficient of 0.855 dB$\mu$m$^4$/km and a transmission loss of 0.171 dB/km with respect to light having a wavelength of 1.55 $\mu$m without annealing.

Examples 3 to 5 yielded a "glass diameter fluctuation" of ±0.15 $\mu$m and a "bending abnormality ratio" of 0%, thereby suppressing the occurrence of "glass diameter fluctuation" and the deterioration in bending of the optical fiber as compared with Comparative Example 4 yielding a "glass diameter fluctuation" of ±0.8 $\mu$m and a "bending abnormality ratio" of 20%, in which the drawing was carried out in the state where the distance L5 was provided between the drawing furnace 11 and heating furnace 12 while lacking the buffer chamber 41.

In Examples 3 to 5, the number of occurrences of "spike" per 1000 km of the optical fiber was 0, whereby the "spike" was restrained from occurring as compared with Comparative Example 5 in which the number of occurrences of "spike" per 1000 km of the optical fiber was 12 while the drawing was carried out in the state where the drawing furnace 11 and the heating furnace 121 were directly connected to each other.

Examples 4 and 5, in which the optical fiber preform to be drawn had a larger diameter (outer diameter of 80 mm), suppressed the occurrence of "glass diameter fluctuation" by using He gas as the first gas. It is presumed to be because of the fact that He gas having a higher thermal conductivity is more effective in suppressing the natural convection within the drawing furnace.

The reason why Example 5 yielded a transmission loss greater than that of Example 4 is presumed to be because of the fact that, when He gas was caused to flow into the heating furnace, He gas did not reach its set temperature at the upper and lower ends of the furnace, whereby the optical fiber was suddenly cooled.

The case where the heating furnace 121 is directly connected to the drawing furnace 11 (muffle tube extension 16) in an airtight fashion as shown in FIG. 7 yields problems as follows:

(1) In order to directly connect the heating furnace to the drawing furnace, the heating furnace must have a structure similar to that of the drawing furnace, whereby the apparatus has a larger scale (e.g., a carbon heater must be employed for cooling the furnace with water). Consequently, it becomes harder to maintain the heater, the muffle tube, and the like.

(2) When drawing an optical fiber preform having a larger diameter, it is preferred that He gas be used in the drawing furnace in order to stabilize the glass diameter, whereas $N_2$ gas or air be used in the heating furnace in order to suppress the cooling of fiber. When the drawing furnace and the heating furnace are directly connected to each other, however, the gas usable therein is limited to one species, whereby two kinds of gases cannot be used as mentioned above.

As can be seen from the results of experiments mentioned above, since the apparatus and method for making an optical fiber in accordance with the second embodiment is provided with the heating furnace 121 for heating the optical fiber 3 at a temperature within the range of 1200 to 1700° C. before it is coated with the UV resin 39 after being drawn upon heating in the drawing furnace 11, the cooling rate of the above-mentioned optical fiber 3 is slowed down in a predetermined segment in the portion where it attains a temperature of 1200 to 1700° C., so that the randomness in atomic arrangement is reduced, whereby it is possible to make the optical fiber 3 whose transmission loss is reduced by lowering the Rayleigh scattering intensity from the drawing upon heating to the coating with the UV resin 39. Also, since the Rayleigh scattering intensity is lowered by controlling the cooling rate of the optical fiber 3 before being coated with the UV resin 39 after being drawn, the heat treatment for reheating such as that in the above-mentioned prior art is unnecessary, whereby this embodiment can be applied quite easily to the mass production of the coated optical fiber 4 whose surface is coated with the UV resin 39 cured thereon.

Since the heating furnace 121 is disposed with a gap L5 with respect to the drawing furnace 11, whereas the gap is formed into the buffer chamber 41 (first buffer cell 42 and second buffer cell 45) in which the first gas to become the atmosphere gas within the drawing furnace 11 (muffle tube 13) and the second gas to become the atmosphere gas within the heating furnace 121 (muffle tube 123) exist in a mixed state, the dust occurring within the drawing furnace 11 is restrained from entering the heating furnace 121, whereby the occurrence of "spike" or the deterioration in strength of the optical fiber 3 can be suppressed.

Due to the existence of the buffer chamber 41 (first buffer cell 42 and second buffer cell 45), the turbulence of outside air flows becomes less influential between the drawing furnace 11 and the heating furnace 121, whereby the occurrence of "glass diameter fluctuation" or the deterioration in bending of the optical fiber 3 can be suppressed.

Since the buffer chamber 41 (first buffer cell 42 and second buffer cell 45) has the barrier 43 formed with a plurality of exit holes 44 and the barrier 46 formed with a plurality of exit tubes 47, the turbulence of outside air flows can be suppressed more reliably, whereby the occurrence of "glass diameter fluctuation" or the deterioration in bending of the optical fiber 3 can further be suppressed. Since the first gas flowing from the drawing furnace 11 (muffle tube 13) side is discharged through the exit holes 44 and exit tubes 47, the dust occurring within the drawing furnace 11 is further restrained from entering the heating furnace 121 (muffle tube 123), whereby the occurrence of "spike" or the deterioration in strength of the optical fiber 3 can further be suppressed.

When a gas having a thermal conductivity on a par with or lower than that of the first gas is used as the second gas, in particular when He gas is used as the first gas while $N_2$ gas or air is used as the second gas, the optical fiber 3 with a lowered transmission loss can be made while the drawing can be carried out stably in the case where the optical fiber preform 2 having a relatively large diameter is used for drawing.

Preferably, the entering temperature of the drawn optical fiber 3 with respect to the buffer chamber 41 (first buffer cell 42) falls within the range of 1400 to 1900° C. When the entering temperature of the drawn optical fiber 3 with respect to the buffer chamber 41 falls within the range of 1400 to 1900° C. as such, the drawn optical fiber 3 enters the heating furnace 121 while in a high-temperature state, so that the drawn optical fiber 3 is annealed from the relatively high-temperature state in the heating furnace 121, whereby the transmission loss of the optical fiber 3 can be lowered.

Though the buffer chamber 41 is constituted by the first buffer cell 42 and second buffer cell 45 in the second embodiment, it is not restricted thereto but can be constituted so as to provide one buffer cell or three or more buffer cells.

As long as a gas mixture layer exists between the muffle tube extension 16 and the heating furnace 121 (muffle tube 123), it is not always necessary to provide the buffer chamber 41 itself. When the drawing furnace 11 (muffle tube extension 16) and the heating furnace 121 are disposed close to each other, e.g., the gap L5 between the drawing furnace 11 (muffle tube extension 16) and the heating furnace 121 is set to about 10 mm, the first gas to become the atmosphere gas within the drawing furnace 11 (muffle tube 13) and the second gas to become the atmosphere gas within the heating furnace 121 (muffle tube 123) are mixed so as to form a gas mixture layer in the space between the drawing furnace 11 and the heating furnace 121, so that this space attains a state substantially separated from the outside air, thereby yielding effects similar to those obtained when the buffer chamber 41 is provided. In the case using He gas as the first gas in the configuration lacking the buffer chamber 41, the optical fiber 3 will be cooled if He gas invades the lower part, whereby it is preferred that a barrier or the like for preventing He gas from invading the lower part be provided. However, the configuration provided with the buffer chamber 41 is preferably employed in view of the fact that it can make the pressure within the buffer chamber 41 higher than the outside pressure so that the turbulence of outside air flows can reliably be made less influential.

Though the heater 122 of the heating furnace 121 is constituted by the first heater 122a, second heater 122b, and third heater 122c in the second embodiment, the number of heaters is not restricted thereto, whereby it may also be constituted by a single heater or four or more heaters.

The present invention is applicable to the drawing of not only the optical fiber preform having a core portion constituted by pure silica glass and a cladding portion constituted by fluorine-doped glass used in the above-mentioned Examples but also Ge-doped optical fiber preforms having a core portion doped with Ge, for example.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of making an optical fiber, which draws an optical fiber preform upon heating and coats thus drawn optical fiber with a resin; said method comprising the steps of:

drawing said optical fiber preform upon heating in an atmosphere constituted by a first gas having a predetermined thermal conductivity;

heating and annealing said drawn optical fiber in an atmosphere constituted by a second gas having a thermal conductivity lower than said predetermined thermal conductivity of said first gas;

coating said annealed optical fiber with said resin;

supplying said first gas into an upper portion of a drawing furnace so that said first gas flows downward said drawing furnace; and discharging said first gas from a first gas exit section disposed between said drawing furnace and a heating furnace; and discharging said second gas from said heating furnace so that said first gas and said second gas are not mixed in said drawing furnace.

2. A method of making an optical fiber according to claim 1, wherein a heating furnace disposed with a gap with respect to a drawing furnace for drawing said optical fiber preform upon heating is used so as to anneal said drawn optical fiber in said heating furnace.

3. A method of making an optical fiber according to claim 1, wherein He gas is used as said first gas; and wherein one of $N_2$ gas, Ar gas, and air is used as said second gas.

4. A method of making an optical fiber according to claim 1, wherein employed as said heating furnace is a heating furnace having a muffle tube through which said drawn optical fiber passes, said muffle tube being disposed at a position where said drawn optical fiber has an entering temperature within the range of 1400 to 1800° C. with respect to said muffle tube; and wherein said drawn optical fiber is annealed in said heating furnace.

5. A method of making an optical fiber according to claim 2, wherein said gap is formed into a gas mixture layer in which said first and second gases exist in a mixed state;

the method comprising: feeding said optical fiber drawn by said drawing furnace to said heating furnace by way of said gas mixture layer; and heating said drawn optical fiber in said heating furnace such that said optical fiber has a temperature within the range of 1200 to 1700° C.

6. A method of making an optical fiber according to claim 5, wherein a barrier for separating said gas mixture layer from the outside air is provided, said barrier being formed with a gas exit section for letting out at least said first gas.

7. A method of making an optical fiber according to claim 5, wherein said drawn optical fiber has an entering temperature within the range of 1400 to 1900° C. with respect to said gas mixture layer.

\* \* \* \* \*